United States Patent [19]
Friedrich

[11] 3,965,673
[45] June 29, 1976

[54] APPARATUS FOR STARTING AIRCRAFT ENGINES AND FOR OPERATING AUXILIARY ON-BOARD POWER GENERATING EQUIPMENT

[75] Inventor: Helmut Friedrich, Bremen, Germany

[73] Assignee: Vereinigte Flugtechnische Werke-Fokker Gesellschaft mit beschrankter Haftung, Germany

[22] Filed: May 20, 1974

[21] Appl. No.: 471,327

[30] Foreign Application Priority Data
May 19, 1973 Germany............................ 2375592
Mar. 22, 1974 Germany............................ 2413882
Mar. 28, 1974 Germany............................ 2414918

[52] U.S. Cl................................ 60/39.14; 60/39.15
[51] Int. Cl.[2]........................ F02C 7/26; F02C 7/32
[58] Field of Search.................. 60/698, 712, 39.14, 60/39.15, 39.18 C; 62/402, DIG. 5; 244/58

[56] References Cited
UNITED STATES PATENTS

| | | | |
|---|---|---|---|
| 2,777,301 | 1/1957 | Kuhn | 244/59 |
| 2,961,939 | 11/1960 | Typaldos | 62/136 |
| 2,969,653 | 1/1961 | Trowbridge | 62/402 |
| 3,416,309 | 12/1968 | Elmes et al. | 60/39.14 |
| 3,481,145 | 12/1969 | Oldfield | 60/39.14 |
| 3,660,977 | 5/1972 | Reynolds | 60/39.14 |

FOREIGN PATENTS OR APPLICATIONS 1,229,203 4/1971 United Kingdom................ 60/39.14

Primary Examiner—C. J. Husar
Assistant Examiner—L. Casaregola
Attorney, Agent, or Firm—Ralf H. Siegemund

[57] ABSTRACT

Two aircraft jet engines are associated respectively with two sub-systems each comprised of a gas turbine for starting one of the engines and driving a set of secondary power generators such as hydraulic pump and electric generator and an air conditioning unit. The two sub-systems are drivingly cross-linked so that either gas turbine can drive both sets. The air conditioning units as well as the gas turbines receive tapped air from the engine compressors, whereby the gas turbines may run with or without combustion. An emergency power pack may be provided, preferably in selective driving connection to one of the sub-systems to provide for the possibility of starting a gas turbine and driving, if necessary, the power generators of that sub-systems or furnishing hydraulic and electric power on a emergency basis when all sub-systems have failed.

24 Claims, 2 Drawing Figures

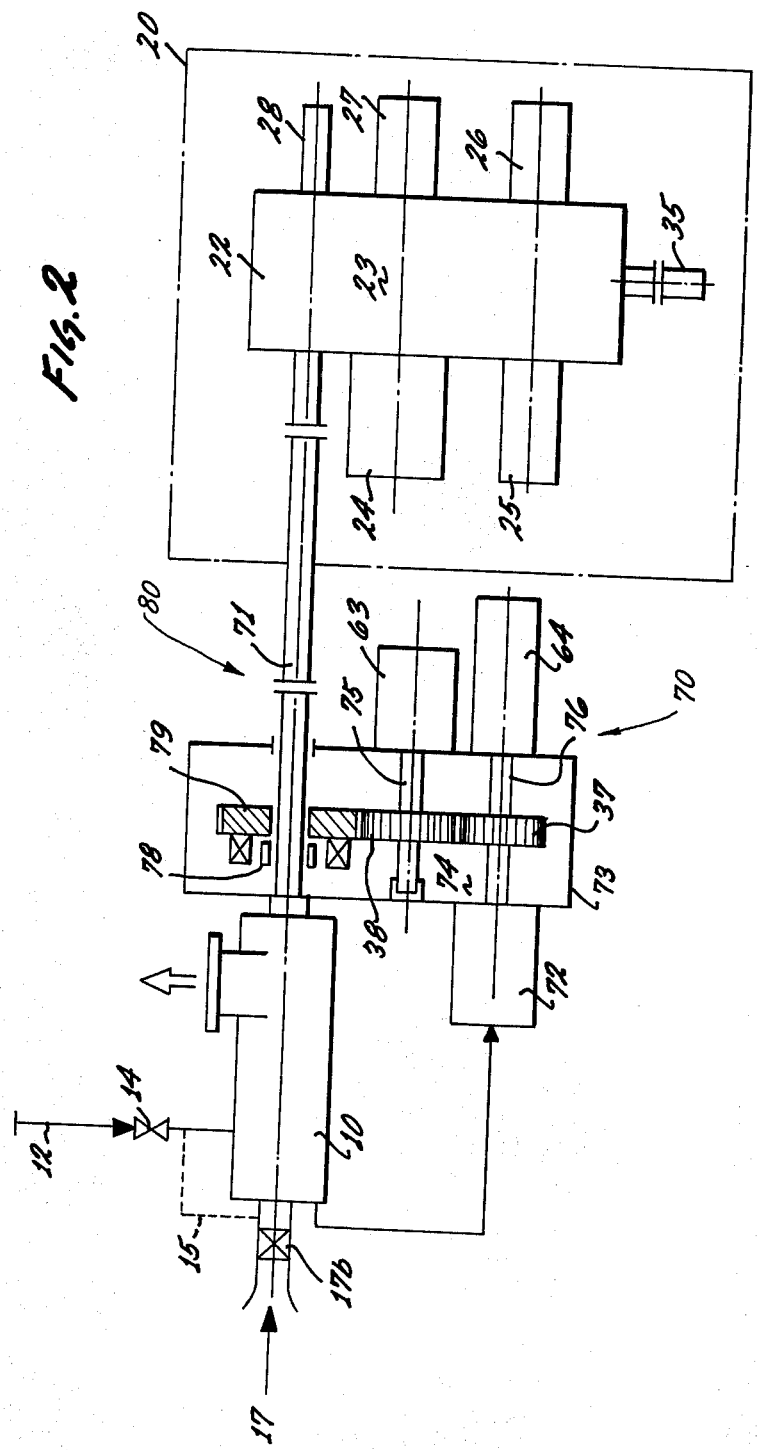

APPARATUS FOR STARTING AIRCRAFT ENGINES AND FOR OPERATING AUXILIARY ON-BOARD POWER GENERATING EQUIPMENT

BACKGROUND OF THE INVENTION

The present invention relates to the starting of aircraft engines, particularly jet engines and to the driving of on-board, auxiliary power generating equipment. The invention is developed particularly in relation to VTOL type aircraft, but is not restricted thereto.

It is known to provide an auxiliary gas turbine in an aircraft for purposes of starting the main engines. Furthermore, such a gas turbine can be used to drive additional equipment such as hydraulic pump, electric generator and fuel pump. The usual manner of driving such auxiliary power equipment, however, is to connect them to one of the engine shafts.

It was found however, that the disposition of an equipment carrier right at one of the engines and connecting it thereto is a disadvantageous arrangement because the equipment is not readily accessible for maintenance. Moreover, arranging the several pieces of auxiliary equipment right at the engine may lead to compromises in the aerodynamic design of the engine casing precluding optimization. Also, a gear permitting speed control has to be used here because for example the a.c. frequency of the generator must be maintained independently from the engine speed.

DESCRIPTION OF THE INVENTION

It is an object of the present invention to improve on starting of aircraft engines as well as on driving and arranging on-board auxiliary equipment.

It is another object of the present invention to improve on the employment and operation of auxiliary gas turbines on board of aircrafts.

It is another object of the present invention to improve on the redundancy and stand-by equipment for insuring continued power supply in aircraft, particularly here with regard to continuation of supplying electrical and hydraulic power.

It is a further object of the present invention to provide for a new and improved inter-relationship between an auxiliary gas turbine, secondary power generating equipment and emergency units of both the driving and the driven variety.

In accordance with the preferred embodiment of the present invention it is suggested to separate the main engines of an aircraft completely from the auxiliary power equipment as far as connection for rotationally driving the equipment is concerned, and to provide for two auxiliary gas engines each provided for starting different engines and each driving a separate power pack equipment, via a distribution transmission for rotational power serving also as equipment carrier. Each power pack includes at least one electric generator, one hydraulic pump, one fuel pump and possible other equipment, to be driven on a redundancy basis, so that failure of or in one power pack will not deprive the aircraft of vital power generating functions needed for further operation.

It can readily be seen, that the power packs can be placed conveniently remote from the engines, more in interior portions of the craft so that no compromises are needed concerning aerodynamics. Moreover, accessability for maintenance may become the primary aspect for placing the power packs, and the driving of all secondary power generating equipment in the aircraft is rendered independent from engine speed. One does not need any longer heavy and expensive speed controllers for rendering the power pack independent from engine speed variations.

In the preferred form of practicing the invention, air is provided to each gas turbine by its own compressor, at least as long as the main engines do not run. In the case of high altitude flight, at the latest, air is tapped from the main compressor of the respective main engine, either to sustain combustion in the gas turbine or to drive the turbine directly with the air from the compressor of the respective aircraft engine, without injection of fuel into the combustion chamber of the gas turbine. The gas turbine may be driven on the ground in the same fashion, using an external ground compressor for connection to the gas turbine. Controlling the air flow into gas turbine permits speed control thereof.

The gas turbine should normally operate with injected fuel and regular combustion, but in the case of failure in the fuel supply for the gas turbine, the latter may still run. This then reduces the probability of complete dropout of the gas turbine. Moreover, running a gas turbine on compressed air still permits driving the auxiliary equipment even if the fuel system for the gas turbine is defective or if emission of polluting exhaust gases as far as the gas turbine is concerned is to be avoided. One can see that running the gas turbine on compressed air only reduces operating temperature, so that its power output is somewhat reduced but its life is extended.

Redundancy of power supply equipment has, of course, the advantage of increased safety in the case of equipment failure. Should one or the other gas turbine fail, one does not have to shut down the respective power pack and channel. Instead, it is suggested to cross-link the two distributors of rotational energy to drive one from the other if the need arises. Clutches as well as overload clutches or other protection should be provided in that connection.

This particular concept of cross-linking the driving of the power packs relates generally to the point that the pneumatic power for the two gas turbines is derived from different main engines (which usually are but do not have to the same engine in each instance which the respective gas turbine starts). In the case of failure of one of the engines, the respective gas turbine will no longer receive compressed air even though the gas turbine as such remains operational. In this case the particular gas turbine is shut down, and both secondary power supply channels are driven by the other gas turbine which receives pressurized air from the or one of the main engine(s) which remains operational. Alternatively the gas turbine associated with the failed engine can be supplied and thereby kept operating by the operational engine(s).

It was found advisable to provide for an emergency power pack, possibly of limited capacity for reasons of weight and space but adequate to provide secondary power to maintain the aircraft operational as such. This emergency power pack may include a turbine receiving air from one of the main engine compressors or from one of the gas turbines or through a local gas generator. Moreover, that particular turbine should be able to restart at least one of the gas turbines and, possibly, to drive one of the power packs, other than the emergency power pack. This way, local failure can be more readily isolated.

Using the emergency turbine to attempt restarting of an auxiliary gas turbine may be beneficial if the dropout of that turbine was due to temporary causes and not an equipment failure. Such restart attempt will not be made when the gas turbine was shut down because of dropout of the main engine from which it receives compressed air. On the other hand using multiple sources for compressed air or gases to drive the emergency turbine permits gradual adaption to various cases of emergency. If the normal secondary power generating equipment other than the gas turbines have dropped out, air for the emergency turbine is taken either from the main engine or developed by a local gas generator, or from one of the gas turbines. On the other hand running the or one of the normal secondary power packs when operative by means of the emergency turbine is a particular mode of operation entered when both of the gas turbines have dropped out. Air for the emergency turbine is then available either from a main engine or through the local, emergency gas generator.

Further features relate to integration of one or several air conditioning systems for the aircraft, whereby in particular a compressor for such air conditioning and climate control unit may perform additional functions, particularly for starting the main engines, while on the other hand decompression of conditioned air can be used in a turbine which assists the gas turbine and provides load relief accordingly. Moreover, the compressor of the gas turbine does not have to be designed for tapping air on the ground.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a modification showing a preferred form of incorporating an emergency stand-by feature into the system.

Figure 1:
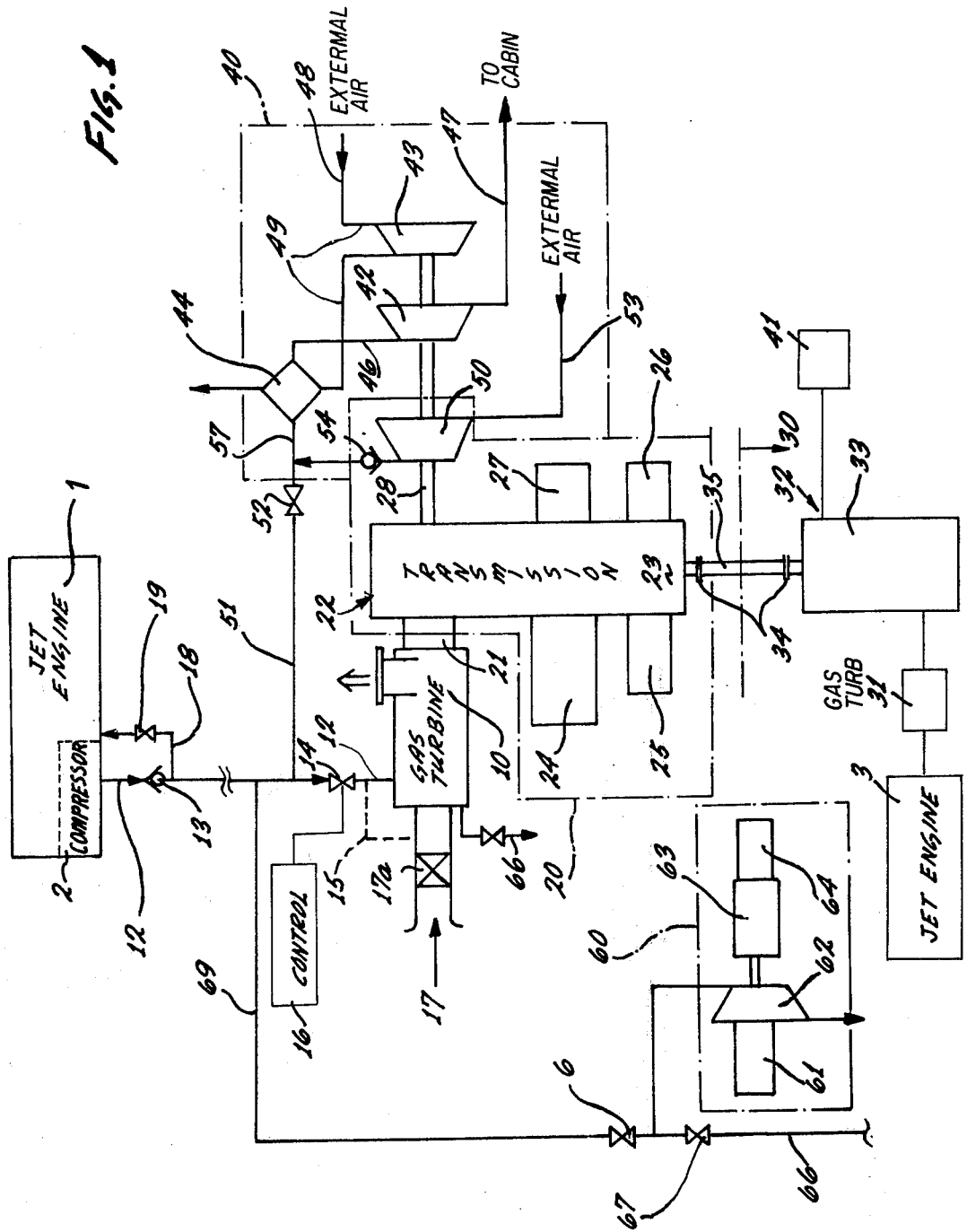
FIG. 1 is a diagram of a layout of a system in accordance with the preferred embodiment of the invention.

Turning now to the detailed description of the drawings, reference numerals 1 and 3 denote two main engines of an aircraft including particularly for engine 1 a schematically indicated compressor 2. Engine 3 has, of course, a similar compressor. The overall system includes further two auxiliary or supplemental gas turbines 10 and 31; two auxiliary equipment units or secondary power packs 20 and 30; an air conditioning system 40 (possibly a second one, 41) and an emergency equipment system 60.

The auxiliary equipment units 20 and 21 constitute two separate sub-systems which can be regarded as power packs for generating secondary power such as electrical and hydraulic power. The two power packs, sub-systems or units 20 and 21 are constructed similarly, so that only one thereof is shown in greater detail. The same is true as far as the two gas turbines is concerned. There are, therefor, two secondary power channels driven each by gas turbines and located, relatively speaking, remote from the respective two engines 1 and 3. The gas turbines 10 and 31 however, are drivingly coupled respectively to the main engines 1 and 3 for operating as starters.

Turning now to details, the gas turbine 10 is connected to the compressor 2 of the main engine 1 via a tap line 12 for tapping some of the compressed air from the main engine and feeding same to the gas turbine via a check valve 13 and a control valve 14. In lieu of control valve 14 control of air flow into the turbine 10 can be provided by varying the disposition or orientation of turbine entrance guide vanes establishing a grid of variable passage width for the compressed air as fed to the gas turbine or its compressor.

The trapped air is provided to gas turbine 10 for sustaining combustion therein. Alternatively, the tapped air may be fed to the compressor of the gas turbine as indicated by dashed line 15. In this case, a single internal feed path suffices for compressed air as between gas turbine compressor and the combustion chamber of the turbine 10, so that the gas turbine compressor operates in cascade with the compressor 2 for feeding air to the gas turbine.

In order to sustain combustion, fuel is also injected into the combustion chamber of the gas turbine 10. However, in the case of fuel injection failure or even intentionally, turbine 10 can be driven just by the compressed air as provided without augmentation of pressure energy by combustion. The efficiency is somewhat reduced, but under emergency conditions, such as failure of fuel supply to the gas turbine or of its fuel injection system, turbine operation can be sustained and rotary power can be provided by turbine 10 even on the basis of compressed air alone and as derived from the compressor 2 of the respectively pneumatically associated main engine 1 but without cascading with the compressor of turbine 10. Actually, that latter compressor should be disconnected from the gas turbine 10 in this mode of operation.

The pressure regulator 16 may be provided to control the flow of compressed air to the gas turbine and to thereby provide speed control of the turbine. The control may operate in feedback configuration and here particularly in response to measured rotational speed of the gas turbine to obtain constant speed.

Gas turbine 10 has another source of air supply, taken from an air intake 17 and to be effective when the aircraft is on ground, and the main engine 1 is not yet running. Reference number 17a denotes a closable structure for the air intake.

In order to run the gas turbine as a compressed air turbine even when the aircraft is still on ground with no engine running, a ground compressor may be connected to the gas turbines for feeding them with air, sufficiently compressed for running the gas turbines even without injection of fuel, either because the fuel injection system is not working or one wants to avoid pollution, such as in the case of test runs in a hangar. The main engines can, therefor, be started by the gas turbines even if combustion cannot be sustained for any reason.

The gas turbine such as 10 is supplied air from compressor 2 of main engine 1 at high altitudes, when the outside air pressure is too low. The alternate supply of such a gas turbine to be affective at different altitudes is subject of a different patent application by me and another (Ser. No. 417,481). However, for the present system it should be mentioned that the feeding of compressed air from main engine compressor 2 to the gas turbine 10 is not regarded as a high altitude alternative, but the preferred mode of running the gas turbine once the main engine has been started, even if the aircraft is still on the ground. This way no in-flight changeover in the supply of compressed air is needed.

A branch line 18 with control valve 19 and connected to line 12 at the output side of check valve 13 provides for passage of compressed air when fed into line 12 in the opposite direction to provide compressed air to engine 1 from a source different from the compressor 2 of the main engine. Air fed to engine 1 in that manner acts either on a starter air turbine included in the engine 1, or the turbine blades of engine 1 themselves are acted upon by this flow of compressed air. This air will be furnished by a compressor 50 as will be described more fully below.

The gas turbine 10 has a driving output illustrated as a flange connection 21 to an equipment carrier 22. This equipment carrier pertains to secondary power pack 20 and includes a distributing transmission gear 23 drivingly connected to the shaft of turbine 10 as traversing connector 21. The equipment unit 20 includes an electric generator 24 flanged onto carrier 23 and providing electrical energy generally and for the engine 1 in particular. The auxiliary equipment includes additionally hydraulic pumps 25 and 26, and a fuel pump 27 is also included in the equipment unit 20. All these components 24 to 27 may be flanged to the casing 22 of transmission 23 to provide for a compact design. The fuel pump 27 pumps fuel for the main engine 1.

Additionally, a rotary output shaft 28, couples the transmission of power unit 20 to the air conditioning system 40. Among other components, compressor 50 is included in the air conditioning and climate control system 40. However from a conceptional point of view compressor 50 could be regarded as part of the auxiliary equipment driven by gas turbine 10 via the transmission 23, except that compressor 50 is not necessarily (but could be) physically mounted on equipment carrier 22. The sharing function of compressor 50 was already alluded to above, namely that the compressor provides compressed air to engine 1 for starting same. A control valve 52 opens a feeder line for this purpose and valve 19 runs compressed air into the main engine 1. The function of compressor 50 as part of the air conditioning system will be described below.

A shaft 35 connects the transmission 23 to a transmission 33 of the second equipment unit 30. The unit 30 includes the same type of equipment as unit 20 and, as already stated, is driven by a second gas turbine 31 which receives tapped air from the compressor in the or a second engine 3 of the aircraft. The electrical generator and the hydraulic pumps in unit 30 can be regarded as redundant components. However, under normal conditions electrical and hydraulic power generators of the two sub-systems 20, 30 may operate in parallel, on a load sharing basis, whereby either can take the whole load whenever the other one fails. The fuel pump in unit 30 feeds engine 3; but again, either fuel pump could be used to feed fuel to both engines.

It can thus be seen, that each engine is associated with its own auxiliary equipment unit driven by a separate gas turbine, 10 and 31, so that the craft has two power supply channels in the general sense, none of them being driven directly by the main engine, except that the respective gas turbine taps off some of the air compressed in the respective main engine. The path 12 is the power connection as far as compressed air is concerned between engine 1 and turbine 10, there is an analogous connection between engine 3 and turbine 31.

Shaft 35 interconnects the respective transmissions 23, 33 via slip friction or controlled clutches 34. This way, power can be transmitted from either of the transmissions, 23, 33, to the respective other one, and in particular, either gas turbine can drive both equipment units 20 and 30. However, an overload slip friction clutch (not shown) should be included in the rotational connection between the two transmissions, so that in the case of blockage of one or on side the respective other transmission is not damaged. This protection can also be provided by a shear coupling which breaks when the torque on the shaft 35 exceeds a prescribed limit.

The air conditioning unit 40 is driven from the transmission 23 via shaft 28 connected to compressor 50. The shaft is also drivingly connected to a cooling turbine 42 and a blower or fan unit 43. The principle function of turbine 42 is to decompress compressed air thereby obtaining temperature reduction of air before such air is discharged into the passenger cabin. The degree of decompression can be controlled by turbine operation control to thereby control cabin pressure. The decompression by the turbine is the result of using the compressed air to drive the turbine, so that turbine 42 is in effect an auxiliary device providing motive power to compressor 50 and blower or fan 43, eventually also into transmission 23. Generally speaking, turbine 42 is a load relief for the gas turbine 10 assisting it in the production of torque.

The air conditioning system includes additionally a heat exchanger 44 in which thermal energy is exchanged between compressed air before it is fed to turbine 42 via a line 46, and as stated, the decompressed air is discharged into the cabin via path 47. Heat is exchanged in unit 44 as between compressed air and air fed through the heat exchanger by fan unit 43.

These machines 50, 42 and 43 are not necessarily all connected to a common shaft, such as 28, but they may be connected to individual output shafts of transmission 23. These shafts could additionally be interconnected to each other via slip clutches.

Air conditioning of the air craft cabin can be carried out in various ways. A tap line 51 connects the compressor 2 of main engine 1 to heat exchanger 44 which cools the heated compressed air by means of heat exchange with cooled air as furnished by blower 43. The cooled compressed engine air is fed to turbine 42 and may drive the blower 43. Operation of compressor 50 and driving connection to transmission 23 is not needed under these conditions.

The derivation of air to be conditioned from the main compressor is but one option, though the preferred one when the engine runs. Thus, during normal operation, inflight, the air conditioning and climate control processes air tapped from the main engine and passes it into the cabin.

In the alternative, valve 52 may be closed and compressor 50 provides for compressed air into feeder line 57 for heat exchanger 44. This will be the mode of air conditioning when the main engine is not running. Compressor 50 takes air from the environment via a duct and intake 53. Under these conditions a driving connection is also established between unit 40 and gas turbine 10, via transmission 23 and output shaft 28 to drive the compressor 50 and the blower 43 while turbine 42 provides load relief to the shaft.

A further alternative use of compressor 50 can be made, also while the engine 1 is running, in that the low pressure side 53 of compressor 50 is connected to line 51 so that the compressor 50 works in cascade with compressor 2, and compressed air is then fed from compressor 50 only to input line 57 of heat exchanger 44 (valve 52 will be blocked in this case). One can see that in this mode of construction or operation heat exchanger 44 receives compressed air only through compressor 50, which in turn receives either tapped air from compressor 2 of the main engine 1 or from the environment when engine 1 is not running.

Still in the alternative, compressor 50 may suck air from the environment and may receive head pressure inflight in which case air is never tapped from compressor 2 of engine 1 for running the air conditioning system. In lieu or in addition to compressor operation of machine 50 one can tap air from the compressor of the auxiliary gas turbine 10.

The air needed for cooling is sucked by means of the blower 43 through an intake 48 and fed to heat exchanger 44 via line 49 for discharge from heat exchanger 44 to the exterior. Taking air from the environment permits a wide range of heat exchange control particularly when very cold external air is brought into heat exchange relation with the very hot engine air. Alternatively air from the dynamic head can be used which forces itself into the system, so that unit 43 needs to operate only when the craft is still on the ground. In either case, hot compressed air from the main engine is cooled down in heat exchanger 44 to obtain the desired cabin temperature after decompression in turbine 42. In all these cases, compressed air is passed through heat exchanger 44 and turbine 42 for thermal and pressure conditioning and is discharged into the cabin via duct 47. Control of the heat exchange operation and of the turbine establishes the needed temperature and cabin pressure.

In the preferred mode of operation and once engine 1 has been started, valve 52 is opened and check valve 54 prevents back flow so that thereafter the air conditioning system conditions compressed engine air. Should the engine 1 drop out, auxiliary gas turbine 10 continues to run, and if not, turbine 31 will (hopefully), so that compressor 50 of the air conditioning system continues to be receive motive power, and compressor 50 will be able to provide for the air to be conditioned. Compressor 50 is, therefor, provided only for stand-by in flight, and for operation of the air conditioning system when the main engines are off, unless one uses compressor 50 in a cascaded configuration with engine compressor 2.

Another function of compressor 50 was already mentioned above. For starting the main engine pressure is taken from compressor 50 and fed to the main engine 1 before the compressor 2 takes over to feed air to the combustion chamber in the main engine. In the case the compressor of the gas turbine is always in the feed path for compressed air (dotted line 15), it may be convenient to operate compressor 50 also in cascade with that gas turbine compressor as long as engine 1 is not started and its compressor does not yet provide air to the gas turbine.

It can readily be seen, that in the case two air conditioning systems are provided (40 and 41) dividing e.g. the cooling and conditioning power among the two, with each serving as emergency unit in case of drop out of the other, there are two compressors such as 50 for the two climate control units but also for the starting function of each of the main engines, accordingly.

The emergency supply unit 60 includes a gas production unit 61, a pressurized air turbine 62, an electric generator 63 and a hydraulic pump 64. The elements 62, 63 and 64 may all be situated on and connected to a common shaft. The gas production unit 61 is preferably comprised of a hydrazine decomposing unit which provides gas by catalytic or thermal decompositioning of hydrazine. The unit 61 may include also a turbine driven directly by the gas as developed. Alternatively, the decomposed hydrazine is used as alternative propellant for the turbine 62.

A branch line 69 leading to tap line 12 and controlled by a valve 65 permits air for the compressed air turbine 62 to be derived from the compressor 2 of the main engine. In the alternative, a connection 66 controlled by a valve 67 leads to the compressor of the auxiliary gas turbine 10 as well as to the compressor of turbine 31 for taking air from either or both these sources.

It can thus be seen, that emergency unit 60 furnishes electric power as well as hydraulic pressure on an emergency, stand-by basis, to be effective if the generators and/or pumps in both units 20, 30 fail to operate. Unit 60 receives pressurized air either from one (or both) of the two gas turbines, i.e. of the respective compressors therein. Alternatively pressurized air is taken from one of the main engines.

The pressurized air of either source drives turbine 62 which in turn drives units 63 and 64. If either source of pressurized air fails, the hydrazine unit 61 takes over and its turbine drives units 63 and 64. If the second channel has a similar emergency pack still more redundancy is provided for emergency and massive equipment failure.

The system as described, operates as follows. The gas turbines, or at least one of them is started first, sucking air from the environment through intake 17. The gas turbine e.g. 10 drives the power pack 20 and possibly also power pack 30 to obtain balanced load. As long as the aircraft is serviced on the ground a single gas turbine may suffice; when and if not, the second gas turbine for the second power pack starts up also. Turbine 10 drives also compressor 50 to furnish compressed air for the air conditioning system 40. For starting engine 1, the shaft of gas turbine 10 is operatively coupled to the engine in a conventional manner. Furthermore valves 52 and 19 are opened so that compressor 50 as sucking air through intake pipe 53 from the environment can feed compressed air via lines 51, 12 and 18 to engine 1 for starting same, either by driving starter blades in the engine or the turbine blades of the engine themselves.

As soon as the engine runs, check valves 13 and 54 prevent back flow, and the compressor 50 may be shut down. Alternatively, the intake of compressor 50 may be connected to line 51 to obtain cascaded operation on the compressed air feeding line 57 to heat exchanger 44.

Once the aircraft is airborn, or even before that, gas turbine operation can be switched over from intake 17 to tap line 12 by opening valve 14 and closing intake entrance 17a. The same operation will be carried out with regard to turbine 31 and engine 3. This way there is a consistent pneumatic operational connection between engines and gas turbines even though the rotational driving connection between turbines 10 and 31 and engines have been separated after the engines had started.

The two power packs are driven by the gas turbines. The climate control and air conditioning units may be driven from the gas turbines if the compressor 50 and the analogous compressor in the second channel particiipate in the operation.

In the case of equipment failure, operation can be continued in various ways, depending upon the location of the faulty equipment. Either gas turbine can drive both power packs, and either power pack can provide all of the necessary electric and hydraulic power. In the case of massive failure emergency power pack 60 takes over.

The incorporation of the emergency power pack into the system can be provided more fully as will be explained next with reference to FIG. 2, demonstrating still greater versatility in the case of equipment failure which can be localized.

Turning to details of FIG. 2 there is again shown gas turbine 10 with input and output connectors provided just as in FIG. 1. Analogously reference numeral 20 refers to the same or the same kind of secondary power generators. Also, there is a direct driving connection, denoted here 71 between gas turbine 10 and transmission 23. Moreover, a clutch 80 is interposed in the connection, normally being engaged but permitting disconnection of transmission 23 from gas turbine 10. Moreover, unlike FIG. 1, FIG. 2 shows an emergency power pack 70 as being connectible to this shaft 71.

In particular, the emergency power pack includes the electric generator 63, the hydraulic pump 64 and a turbine unit 72 which may be deemed composed of the units 61 and 62 of FIG. 1, so that driving power for the emergency turbine may be provided on the basis of hydrazine decompositioning or compressed air is used as developed elsewhere in the system.

The components 63, 64 and 72 are shown as being mounted to a casing 73 of an equipment carrier which includes gearing 74 on shafts 75, 76 for drivingly connecting secondary power generators 63, 64 to turbine unit 72. Transmission gearing 74 includes meshing gears 37 and 38, the latter being additionally geared to a gear 79 which is journalled on shaft 71 and can be coupled to shaft 71 by means of a freewheeling clutch or coupling 78.

Freewheeling clutch 78 has a first operating state in which power is not transmitted from shaft 71 to gear 79, while in the case of gear 79 being driven from gearing 74 (because turbine 72 is running), torque is transmitted from gear 79 via clutch 78 to shaft 71. There is, therefor, an automatic adaption of two running conditions of shaft 71 to the prevailing situation. When turbine 72 is off, no torque is transferred between 79 and 71. When turbine 7a runs torque is transmitted from 79 to 71.

In the alternative or second operating state of the freewheeling clutch 78, gear 79 as and when being driven by gearing 74 will turn on shaft 71 independently therefrom.

The freewheeling clutch can be replaced by a regular controlled clutch which, e.g. in response to electrical or mechanical commands connects gear 79 to shaft 71 or disconnects it therefrom.

The arrangement operates as follows. It shall be assumed that gas turbine 10 is running, driving shaft 71 to thereby drive the various components connected and pertaining to power pack 20. Turbine 72 is not running because the normal operating conditions do not require participation of turbine 72. The freewheeling clutch 78 has the first operating state, so that power is not transmitted upon the gear 79.

It may now be assumed that turbine 10 does not run but is to be started; the hydrazine decomposing generator in unit 72 is set into operation (e.g. simply by permitting hydrazine to contact a catalyst at a controlled rate). Emergency power generators 63, 64 are, therefor, being driven and run. Gear 79 is likewise running. Since it is still presumed that the freewheeling clutch 78 is in state one, while shaft 71 is not driven by the turbine 10, gear 79 is coupled to shaft 71 and drives same.

Clutch 80 is in the disconnect state so that rotation of shaft 71 is not transmitted upon transmission 23. Instead, gas turbine 10 is being started. If it turns out thhat turbine 10 cannot be restarted clutch 80 is brought into the connect state and the power pack 20 is now driven by emergency turbine 72. The electric generators 63 and as well as the hydraulic pumps 64 and 25, 26 may operate in parallel for reasons of load distribution.

Only when power pack 20 is partially inoperative, clutch 80 is disconnected and emergency power is provided only by units 63, 64. In this case clutch 78 is shifted to the second operational state so that gear 79 freely rotates on the now non-rotating shaft 71.

The physical separation of emergency power pack and regular power pack may be desirable for reasons of installation. However this is not essential and depending on the circumstances it may even be desirable to provide for close positioning of these units. In this case one can use a common equipment carrier for the elements 24 through 27 and 63, 64 and 72. The only difference then is that the emergency units 63, 64, 72 have a separate gear train in that common casing and a clutch such as 78 is provided for the selective connection of that gear train to a portion of shaft 71 inside of that common carrier.

The invention is not limited to the embodiments described above but all changes and modifications thereof not constituting departures from the spirit and scope of the invention are intended to be included.

I claim:

1. Apparatus for starting aircraft engines and driving auxiliary equipment, comprising two independently operating auxiliary gas turbines respectively individually connected to two aircraft engines for driving them for starting;

a first and second plurality of auxiliary equipment each plurality including at least one distribution transmission gearing, an electric generator, an auxiliary compressor and a hydraulic pump all being drivingly connected to the gearing, each of said pluralities establishing a power park operating independently from the respective other one, so that both or either can provide for the respective electric and hydraulic power in the aircraft; at least one of the plurality further including an air turbine drivingly connected to the respective transmission gearing, a heat exchanger receiving compressed air from the respective auxiliary compressor, and providing air to the air turbine, the air turbine discharging decompressed air into the cabin of the aircraft;

the transmission gearings respectively of the first and second pluralities of auxiliary equipment being connected to the two gas turbines and being driven therefrom;

the auxiliary equipment of the first and second pluralities being driven by the respective gas turbine independently from the two aircraft engines, the air turbine acting as load relief; and means for providing compressed air to the gas turbines.

2. Apparatus as in claim 1, including a connection between the compressors of the engines and the gas turbines for feeding compressed air to the gas turbines.

3. Apparatus as in claim 2, including control means for effecting changeover of supply of compressed air to the gas turbines as soon as the gas turbines have started the engines.

4. Apparatus as in claim 1, including means for drivingly interconnecting the transmission gearings so that either of said gas turbines can drive both pluralities of auxiliary equipment.

5. Apparatus as in claim 1, wherein the transmissions are respectively provided in casings, the equipment of the pluralities being respectively mounted on the casings.

6. Apparatus as in claim 1, and including means for feeding respectively compressed air from at least one of the auxiliary compressors to the respective engine that is being started by the respective gas turbine driving the one compressor.

7. Apparatus as in claim 1, wherein air is tapped from one of the engine compressors, the auxiliary compressor being cascaded, the heat exchanger being supplied with compressed air as tapped and as further compressed by the auxiliary compressor.

8. Apparatus as in claim 1, wherein the one transmission gearing is connected to drive a fan unit for driving cooling air through the heat exchanger.

9. Apparatus as in claim 1 wherein the gas turbines can run on compressed air alone as fed to the gas turbine, without combustion taking place in the gas turbine.

10. Apparatus as in claim 9, wherein means are included to control the air flow to the gas turbine for control of the speed of the turbine.

11. Apparatus for driving auxiliary on board equipment of an aircraft independently from any aircraft engine, comprising:

a first and a second plurality respectively of auxiliary equipment and of emergency equipment, each plurality including at least one distribution transmission gearing, an electric generator and a hydraulic pump both drivingly connected to the respective gearing, each of said pluralities establishing a power pack operating independently from the respective other one, so that both or either can provide for the respective electric and hydraulic power in the aircraft;

a gas turbine with output shaft means;

first and second clutch means, for selectively connecting the gearings of the two pluralities to said gas turbine, so that the gas turbine can drive the auxiliary equipment of the first plurality without driving the emergency, equipment of the second plurality;

an auxiliary turbine connected to drive the gearing of the second plurality;

the first clutch means respectively connecting or disconnecting the second gearing to the shaft means for said auxiliary turbine to start said gas turbine or drive said second emergency equipment only; and the second clutch means disconnecting the shaft means from the first auxiliary equipment when the auxiliary turbine starts the gas turbine, but connecting the shaft means to the first auxiliary equipment for being driven by the gas turbine.

12. Apparatus as in claim 11, wherein the first clutch means is a one way, free wheeling clutch, which in its connect state prevents the gas turbine from driving the equipment of the second plurality but permits torque transfer in the opposite direction.

13. Apparatus as in claim 11, wherein the first and second clutch means together connect also the auxiliary equipment of the first plurality to the auxiliary turbine.

14. Apparatus as in claim 11, wherein a gas generator is provided for operating the auxiliary turbine of the emergency power equipment.

15. Apparatus as in claim 11, wherein means are provided to selectively feed compressed air to the auxiliary turbine from the compressor of one of the engine or one of the gas turbines.

16. Apparatus for driving on board auxiliary equipment independently from any aircraft engine and by means of a gas turbine serving also as starter for an aircraft engine, comprising:

a first plurality of auxiliary equipment including at least a hydraulic pump and an electric generator as secondary energy supplier;

a first gear train for drivingly interconnecting the equipment of the first plurality;

a second plurality of emergency equipment including also a hydraulic pump and an electric generator;

a second gear train for drivingly interconnecting the equipment of the second plurality;

an auxiliary turbine connected for driving said second gear train to thereby drive the equipment of the second plurality; and clutch means for completing one of the selective connections at a time; connection of the first gear train to the gas turbine whhen the gas turbine runs; connection of the second gear train to the gas turbine for being started by the auxiliary turbine while disconnecting the first gear train from the gas turbine.

17. Apparatus for starting an aircraft engine and driving auxiliary equipment, comprising as auxiliary gas turbine connected to said aircraft engine for driving it for purposes of starting the engine;

means for providing compressed air to said gas turbine;

a plurality of auxiliary equipment including at least one distribution transmission gearing, an electric generator and a hydraulic pump both drivingly connected to the gearing, further including a decompression turbine and an auxiliary compressor, both being also drivingly connected to said gearing, the decompression turbine providing load relief and feeding conditioned air resulting from decompression in the decompression turbine into the aircraft cabin;

the transmission gearing being connected to the gas turbine and being driven therefrom, whereby the decompression turbine acts as load relief for the gas turbine;

a heat exchanger connected to receive and pass through compressed air from said auxiliary compression during at least some periods of operation and feeding in turn said decompression turbine; and means for feeding a separate air flow through the said heat exchanger to enter into heat exchange with the compressed air as passing through the heat exchanger.

18. Apparatus as in claim 17 and including an emergency power pack including a hydraulic pump, and electric generator and a turbine connected to receive compressed air for driving the pump and the generator of the emergency power pack.

19. Apparatus as in claim 18, including a gearing for drivingly interconnecting the parts of the emergency power pack.

20. Apparatus as in claim 19, including means for drivingly connecting the gearing to one of the transmissions; and means for controlling transfer of torque from the turbine of the emergency power pack to the one transmission.

21. Apparatus as in claim 19, including means for drivingly connecting the gearing of the emergency pack to one of the gas turbines for starting the gas turbine by operation of the turbine of the emergency power pack.

22. Apparatus as in claim 17, wherein said means for providing includes the compressor of the said engine.

23. Apparatus as in claim 17, wherein said means for feeding is a blower unit connected also to said transmission gearing as part of the auxiliary equipment of the plurality.

24. Apparatus as in claim 17, wherein said auxiliary compressor and the compressor of the engine are cascaded to feed said decompression turbine via said heat exchanger.

* * * * *